United States Patent
Lai et al.

(10) Patent No.: US 6,711,663 B2
(45) Date of Patent: Mar. 23, 2004

(54) ALGORITHM OF FLASH MEMORY CAPABLE OF QUICKLY BUILDING TABLE AND PREVENTING IMPROPER OPERATION AND CONTROL SYSTEM THEREOF

(75) Inventors: Chen Nan Lai, Hsinchu (TW); Yao Tse Chang, Hsinchu (TW); Kuo-Hong Wang, Hsinchu (TW); Chanson Lin, Hsinchu (TW)

(73) Assignee: Key Technology Corporation, Hsinchu (TW)

( * ) Notice: Subject to any disclaimer, the term of this patent is extended or adjusted under 35 U.S.C. 154(b) by 156 days.

(21) Appl. No.: 09/987,528

(22) Filed: Nov. 15, 2001

(65) Prior Publication Data

US 2003/0093610 A1 May 15, 2003

(51) Int. Cl.$^7$ .............................................. G06F 12/10
(52) U.S. Cl. ..................... 711/206; 711/103; 711/161
(58) Field of Search ................................ 711/107, 206, 711/117, 118, 202, 161, 162

(56) References Cited

U.S. PATENT DOCUMENTS

| | | | | |
|---|---|---|---|---|
| 5,381,537 A | * | 1/1995 | Baum et al. | 711/206 |
| 5,524,230 A | * | 6/1996 | Sakaue et al. | 711/103 |
| 5,673,383 A | * | 9/1997 | Sukegawa | 714/8 |
| 5,694,571 A | * | 12/1997 | Fuller | 711/113 |
| 5,717,886 A | * | 2/1998 | Miyauchi | 711/103 |
| 5,740,396 A | * | 4/1998 | Mason | 711/103 |
| 5,742,934 A | * | 4/1998 | Shinohara | 711/103 |
| 5,812,814 A | * | 9/1998 | Sukegawa | 711/103 |
| 5,895,501 A | * | 4/1999 | Smith | 711/207 |
| 5,905,993 A | * | 5/1999 | Shinohara | 711/103 |
| 5,946,714 A | * | 8/1999 | Miyauchi | 711/205 |
| 5,951,685 A | * | 9/1999 | Stancil | 713/2 |
| 6,421,798 B1 | * | 7/2002 | Lin et al. | 714/718 |
| 6,446,188 B1 | * | 9/2002 | Henderson et al. | 711/206 |
| 6,460,111 B1 | * | 10/2002 | Shinohara | 711/103 |
| 6,516,400 B1 | * | 2/2003 | Suzuki | 711/206 |
| 2002/0169936 A1 | * | 11/2002 | Murphy | 711/205 |
| 2003/0018877 A1 | * | 1/2003 | Gaskins et al. | 711/207 |

\* cited by examiner

Primary Examiner—Hiep T. Nguyen
(74) Attorney, Agent, or Firm—Rosenberg, Klein & Lee

(57) ABSTRACT

The present invention relates to an algorithm of flash memory capable of quickly building a mapping table and preventing disorder of data due to abnormal disconnection and a control system thereof, wherein pages of a physical block store data of the mapping table of logical block addresses and corresponding physical block addresses. A set of ECC data are used for protection. When the host computer is normally turned on, data of the mapping table are directly stored into a buffer so that the control device can read. The system can quickly build the mapping table to save the time and operation of turning on without the need of a scanning procedure. If an error of the mapping table due to improper operation occurs, the previous mapping table can be retraced to restore the system to the normal state.

11 Claims, 7 Drawing Sheets

ALGORITHM OF FLASH MEMORY CAPABLE OF QUICKLY BUILDING TABLE AND PREVENTING IMPROPER OPERATION AND CONTROL SYSTEM THEREOF

FIELD OF THE INVENTION

The present invention relates to an algorithm of flash memory and, more particularly, to an algorithm of flash memory capable of quickly building a table and preventing disorder of data due to abnormal disconnection and a control system thereof.

BACKGROUND OF THE INVENTION

Along with continual progress of the information industry, high-speed data storage devices (memories) play very important roles due to influence of ever faster CPUs and development of information appliance (IA) products. Because flash memories have the characteristics of non-volatility and easily changing access of data, they have been eagerly expected by users.

As shown in FIG. 1A, at least a flash storage device (NAND type flash are the most popular) 11~19 is connected to a host computer 29 mainly via a control device 20. Of course, the control device 20 can also be built in a subsystem of the host computer 29. The control device 20 comprises a microprocessor 25 therein, which can be connected to the host computer 29 via an interface controller 24 conforming to the protocol of PCMCIA, IDE, ATA, ATAPI, USB, or their combination. One end of the microprocessor 25 can be connected to the data storage device 11 via a storage control logic circuit 26. The microprocessor 25 can also be connected to a buffer controller 22. The buffer controller 22 can temporarily store the data to be accessed by the host computer 29 into a data storage region 21 (a first buffer 211, a second buffer 213, and an N-th buffer 219). Additionally, an ECC logic circuit 23 is respectively connected to the microprocessor 25, the buffer controller 22, and the storage control logic circuit 26. The ECC logic circuit 22 is controlled by the microprocessor 25 to give a corresponding error-correcting code (ECC) data to a data sector to be accessed. Moreover, the microprocessor 25 can be connected to a lookup table 255, which can be used to keep logic block addresses ($L_0$~$L_{m+1}$) and all physical block addresses (PBA) of the corresponding data storage device 11.

As shown in FIG. 1B, a memory used by the lookup table 255 such as a random access memory (RAM) mainly uses a word as an access unit, and is partitioned into a plurality of word addresses LBA (logic block address, $L_0$, $L_1$, ..., $L_m$, $L_{m+1}$, ...). Each logical block address includes an address data mapping to a corresponding PBA (physical block address; $B_3$, $B_2$, ..., $B_m$, $B_{m+1}$, ...). The flash memory 11 mainly uses a block as an access unit, and is partitioned into a plurality of physical block addresses $B_0$~$B_n$. A physical block ($Data_0$~$Data_n$) of each physical block address includes a plurality of block pages. Each page corresponds to a sector of smallest storage unit at the host end. An error-correcting code (ECC; $E_0$~$E_n$) field of each corresponding page in a record block and an LBA ($L_2$, $L_3$, $L_1$, ..., $L_{m+1}$) field recording a corresponding logical block address data can be attached behind each physical block. The PBA field of the lookup table 255 corresponds to the LBA field of the memory 11. For example, the logical address data of the data $Data_0$ stored in the physical block $B_0$ of memory points to the LBA $L_2$ in the lookup table 255. Therefore, $L_2$ is recorded in the LBA field thereof (this data will be stored and will not disappear even if disconnection occurs). The PBA field of the sector $L_2$ of the lookup table 255 points to the $B_0$ (this data will disappear after disconnection occurs), as the double arrowheads of the solid line shown in FIG. 1B.

When the system is turned on, the PBA fields of the lookup table 255 do not exist. The microprocessor 25 will scan all physical block addresses and logical block addresses (LBAs) of the flash memories 11~19, and fill corresponding relations into the physical block address (PBA) fields according to the LBAs, thereby building the complete lookup table 255. However, this way of scanning and then building the lookup table is inconvenient and consumes much operation time.

Moreover, the block $B_0$ is used as a unit when erasing or accessing data due to the structure of the flash memory 11. Therefore, when there exists a physical block to be modified (e.g., the $B_2$), it is necessary to store the data $Data_2$ originally stored in the block $B_2$ into a clean physical block (e.g., $B_{m+1}$), record the logical address $L_1$ in the LBA field behind the physical block $B_{m+1}$, and then erase the $Data_2$ in the block $B_2$ to be modified so that the block becomes a clean block or is recorded as not in use. However, if an abnormal situation such as a sudden disconnection or a crash occurs when the clean block (e.g., $B_{m+1}$) has finished the steps of storing data and filling logical address data but the block $B_2$ to be modified has not yet finished the step of erasing, the host computer will be turned on again and the microprocessor 25 will again scan all physical block addresses of the memory 11. The situation that the two data blocks $B_2$ and $B_{m+1}$ are recorded to have the same logical block address $L_1$ and point to the same corresponding address in the lookup table 255 (as the double arrowheads of the dash line shown in FIG. 1B), or the situation that some blocks may be disconnected may occur. Erroneous connection of data or even damage of data may thus easily arise.

Accordingly, the present invention aims to propose an algorithm of flash memory capable of quickly building a lookup table and preventing disorder of data due to abnormal disconnection and a control system thereof.

SUMMARY OF THE INVENTION

The primary object of the present invention is to provide an algorithm of flash memory capable of quickly building a lookup table and preventing disorder of data due to abnormal disconnection and a control system thereof, wherein pages of a physical block are utilized to store data of a lookup table. When the system is turned on, quick switching is achieved by directly storing into a buffer from the block pages without a microprocessor utilizing a scan program to perform scan of logical addresses to all physical blocks of each memory. Therefore, the operation of the microprocessor can be simplified, and the operation time can also be greatly saved.

The secondary object of the present invention is to provide an algorithm of flash memory capable of quickly building a lookup table and preventing improper operation and a control system thereof, wherein pages of physical blocks of the memory can store data of a lookup table, thereby preventing abnormality of data due to improper operation.

Another object of the present invention is to provide an algorithm of flash memory capable of quickly building a lookup table and preventing improper operation and a control system thereof, wherein data of a lookup table can be protected by a set of ECC data to enhance the accuracy of data.

Yet another object of the present invention is to provide an algorithm of flash memory capable of quickly building a lookup table and preventing improper operation and a control system thereof, wherein all memory blocks can be partitioned into a plurality of segments according to capacity of memory of buffers or block pages. Each segment has a corresponding mapping table of buffers to build the mapping relations of data. When there are data of a block modified, only the related data of the mapping table will be affected. Therefore, time of modification of the mapping table can be effectively decreased, and the situation of erroneous connection of data can be effectively reduced.

Still yet another object of the present invention is to provide an algorithm of flash memory capable of quickly building a lookup table and preventing improper operation and a control system thereof, whereby all physical blocks can be partitioned into a plurality of segments to let the size of a mapping table be reduced to be just a sector (256 words) so that the mapping table can be used as general data and stored into the flash memory. Therefore, the capacity of memory for recording data of physical block addresses can be greatly saved. The present invention can also apply to a storage system connecting a plurality of flash memories.

The various objects and advantages of the present invention will be more readily understood from the following detailed description when read in conjunction with the appended drawing, in which:

DETAILED DESCRIPTION OF THE PREFERRED EMBODIMENTS

Figure 2A:
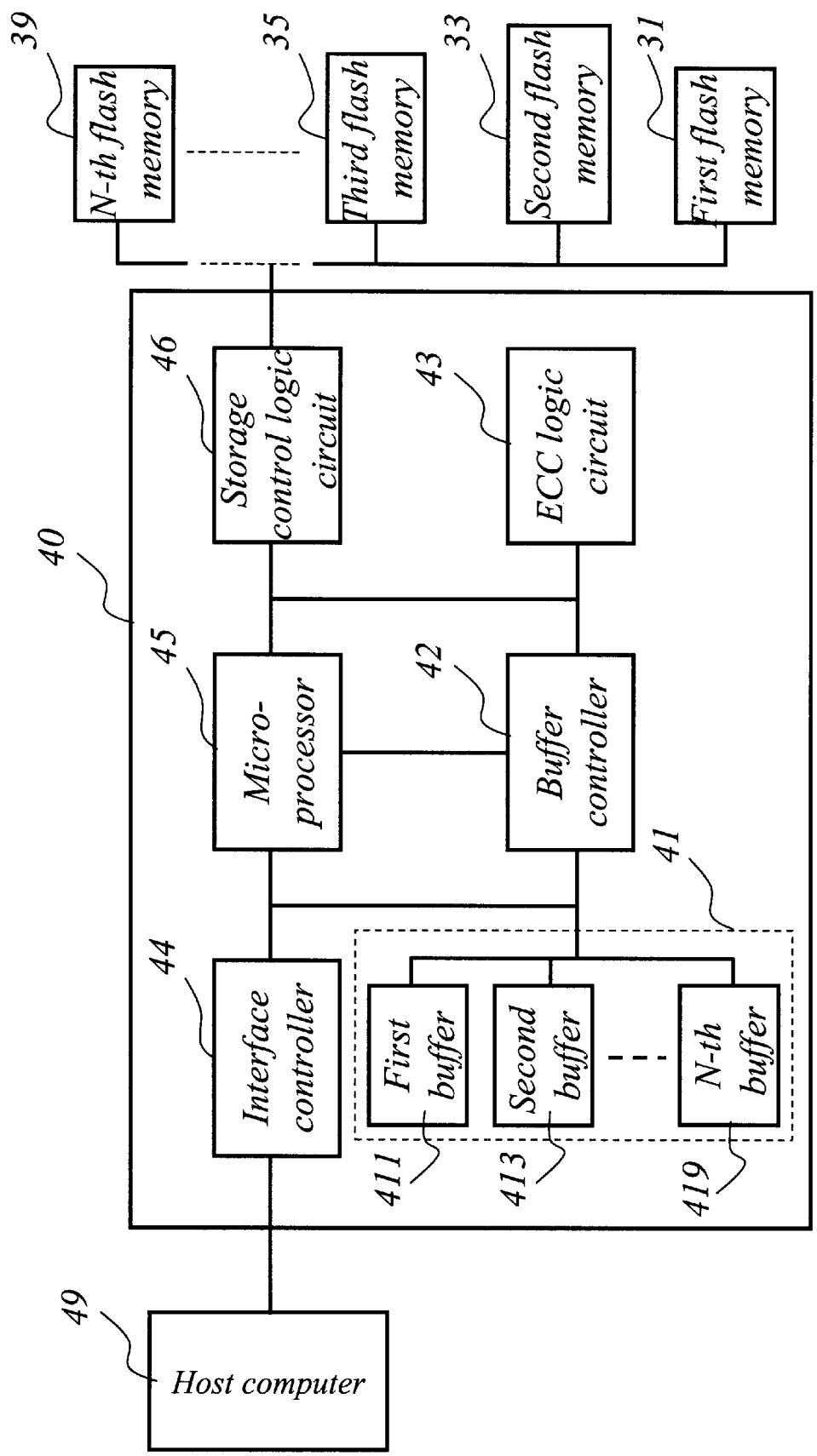
FIG. 2A is a structure diagram of a storage system of a flash memory of the present invention.

As shown in FIG. 2A, at least a data storage device 31~39 is connected to a host computer 49 mainly via a control device 40. Of course, the control device 40 can also be built in a subsystem of the host computer 49. The control device 40 comprises a microprocessor 45 therein, which can be connected to the host computer 49 via an interface controller 44 conforming to the protocol of PCMCIA, IDE, ATA, ATAPI, USB, or their combination. One end of the microprocessor 45 can be connected to the data storage device 31~39 via a storage control logic circuit 46. The microprocessor 45 can also be connected to a buffer controller 42. The buffer controller 42 can temporarily store the data to be accessed by the host computer 49 into a data storage region 41 (a first buffer 411, a second buffer 413, and an N-th buffer 419, each having the size of a sector). Additionally, an ECC logic circuit 43 is respectively connected to the microprocessor 45, the buffer controller 42, and the storage control logic circuit 46. The ECC logic circuit 42 is controlled by the microprocessor 45 to give a corresponding ECC data to a data sector to be accessed. The buffer 419 of the data storage region 41 can be used as a mapping table 419 for storing corresponding physical block addresses (PBAs) of all memory physical blocks.

Figure 2B:
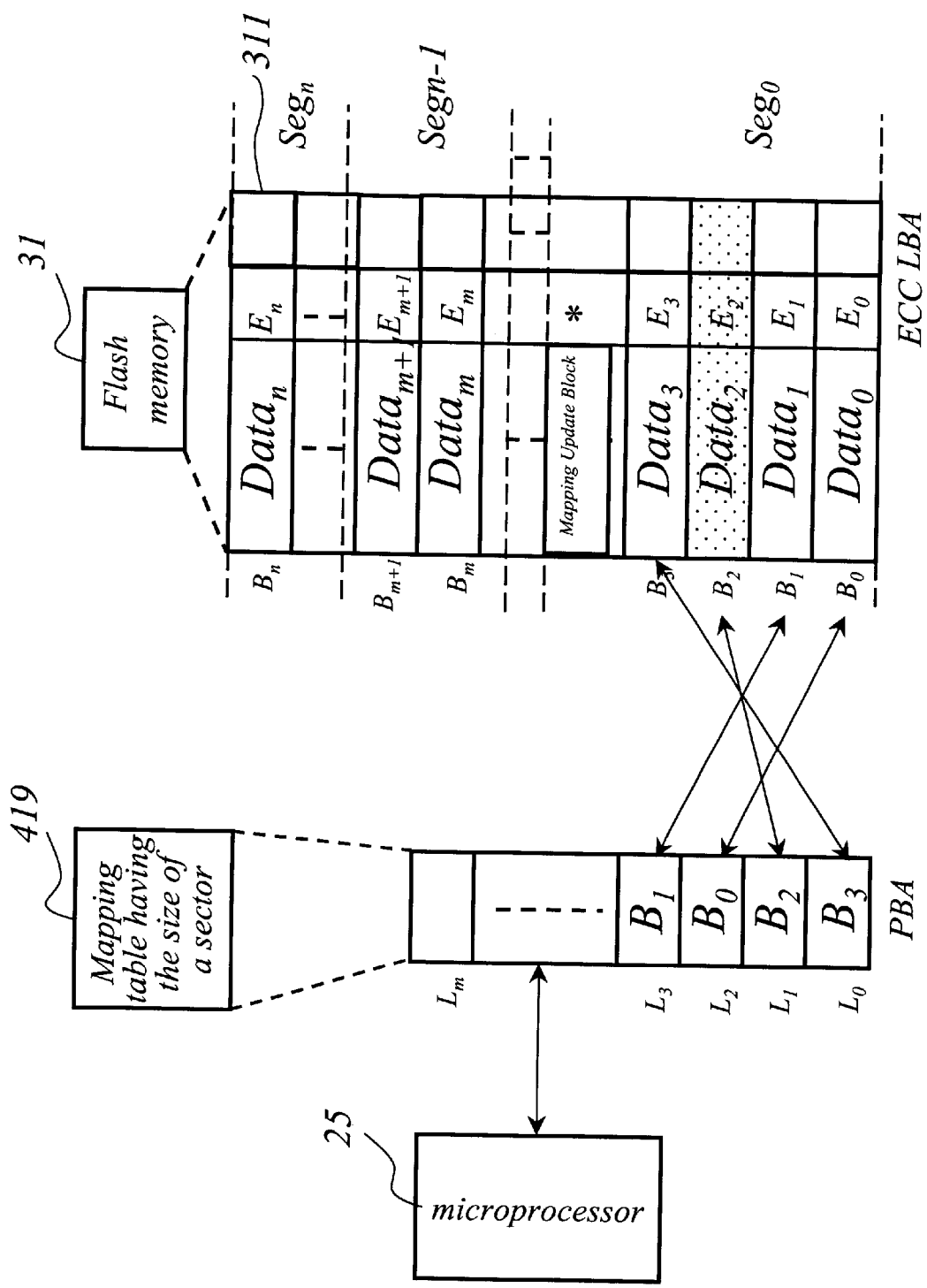
FIG. 2B is a structure diagram of a lookup table of a flash memory of the present invention.
Figure 2C:
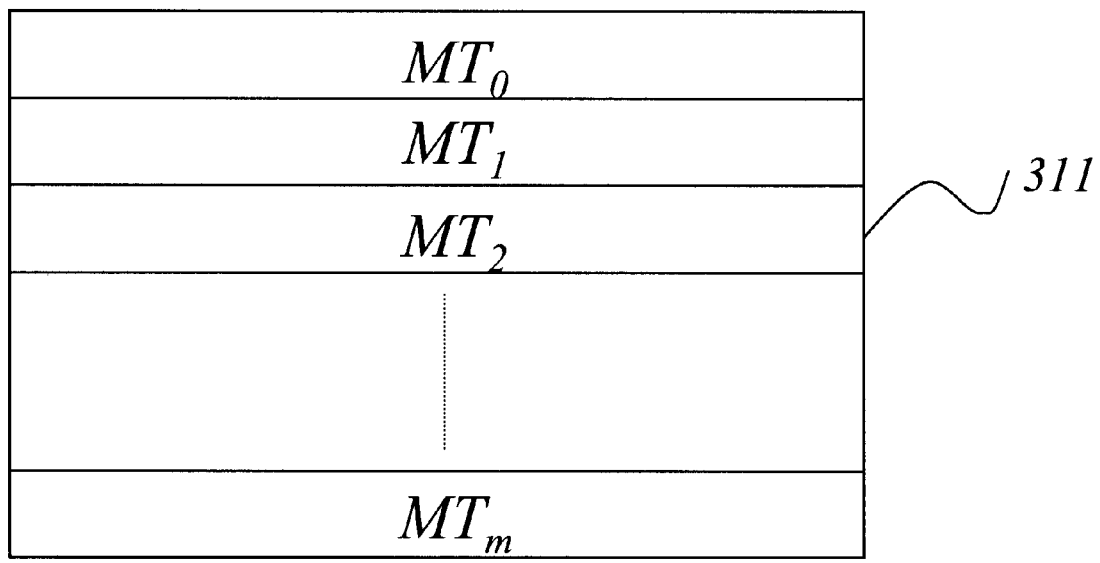
FIG. 2C is a structure diagram of part of pages of physical blocks of a flash memory of the present invention.

As shown in FIG. 2B, the mapping table 419 for storing corresponding physical block addresses PBAs is recorded into the buffer 419 of the control device 40. In order to match the storage capacity 256 bytes or 512 bytes (i.e., 128 or 256 words) of page of the buffer 419 or a physical block ($B_0$), each word $W_0$, $W_1$, ..., $W_m$ of the mapping table 419 includes the address of a corresponding block $B_0$, $B_1$, ..., $B_m$. Therefore, a mapping table 419 can correspond to 128 or less than 256 physical blocks ($B_0$). Therefore, the physical blocks can be partitioned into a plurality of segments ($Seg_0$~$Seg_n$). The number of blocks included in each partitioned segment will be limited within 256 (or 128). Of course, each segment has a special reserved block (as the symbol*shown in FIG. 2B or as shown in FIG. 2C) for exclusively recording mapping update.

Each segment has a corresponding special reserved block for recording mapping update to built mapping relations of data. The initial value of this mapping block is built when the system is initiating. When the host computer 49 is to access a file, the microprocessor 45 of the control device 40 will acquire the mapping table required to be read in by dividing the LBA value introduced from the host computer 49 by the physical block number in the segment, and then by the sector number in the block. The mapping table of this segment will be stored into a mapping buffer 419 by the newest updated page of the special reserved block of mapping update, thereby letting the system conveniently finding out the physical block address this LBA required to map. Moreover, each segment has a special reserved block of mapping update to store newest built mapping relations of data. When there are mapping data of a block modified, only the newest page of the special reserved block of mapping update of this segment will be renewed. Therefore, time of modification of the whole mapping table can be effectively decreased, and the situation of erroneous connection of data can be effectively reduced.

Figure 1A:
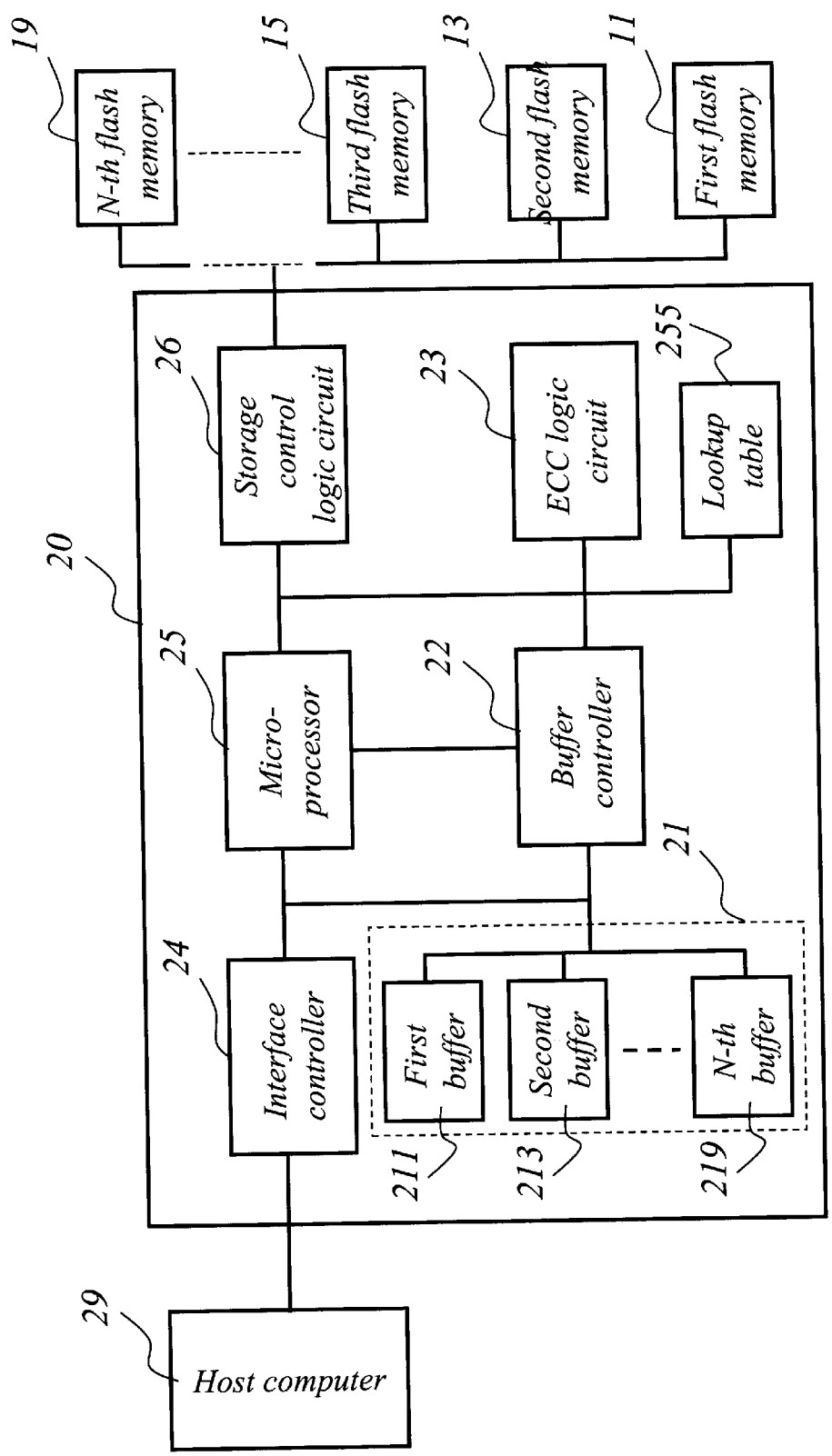
FIG. 1A is a structure diagram of a storage system of a general flash memory in the prior art.
Figure 1B:
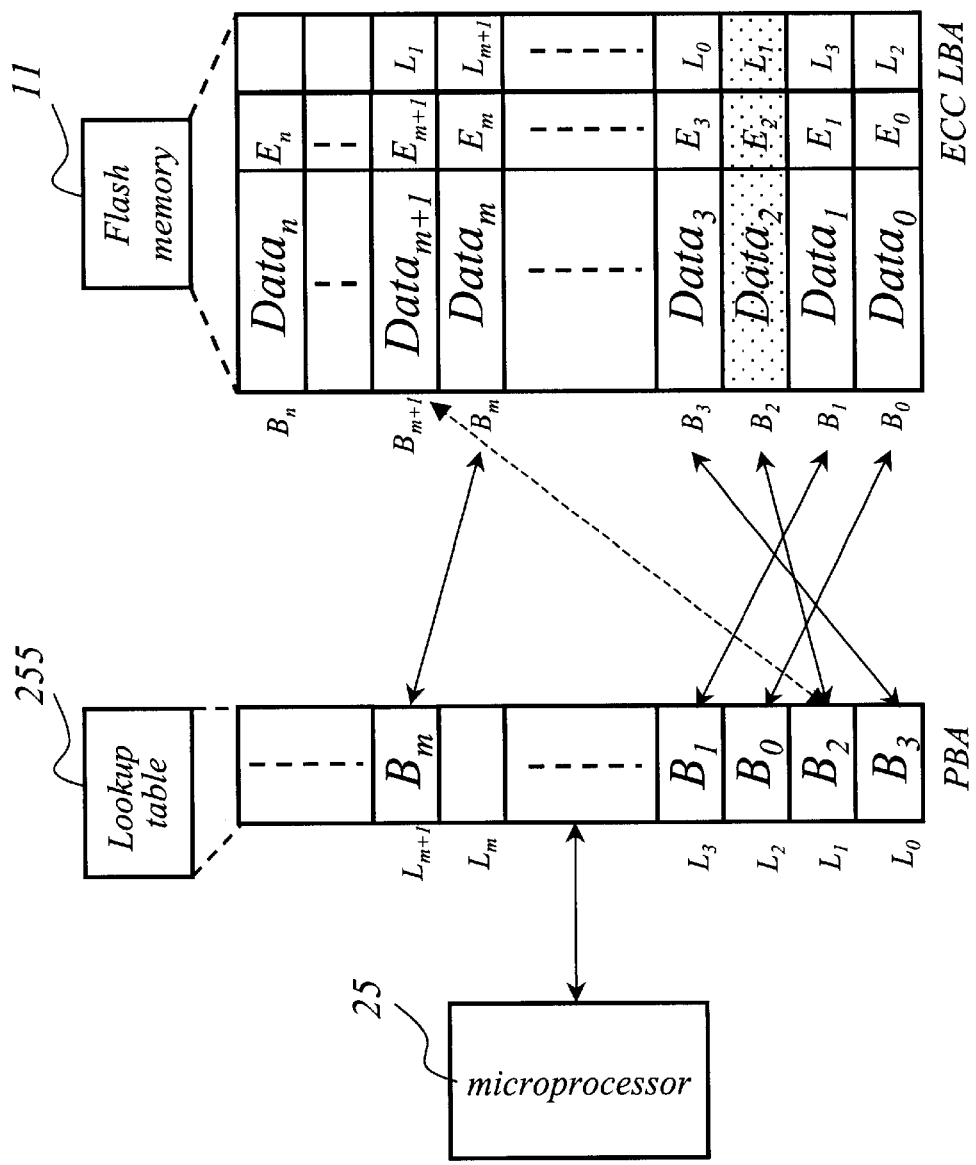
FIG. 1B is a structure diagram of a lookup table of a flash memory in the prior art.

Because the mapping table of the present invention is itself a storable data, when the recorded data in the mapping table 419 are modified, this data can be stored into a partial page 311 of a physical block of a special reserved block of mapping update. This partial page 311 is a data block, which is not mapped and denoted by a special mark "*". This partial page 311 is partitioned into a plurality of segmented pages $MT_0$, $MT_1$, $MT_2$, ..., $MT_m$, wherein m is the number of pages in a block. Please refer to FIG. 2C, when the data recorded in the mapping table 419 is modified, this data can be stored into the $MT_n$ of the physical page 311 of a special reserved block of mapping update. When the data is modified once again, the new mapping relation will be stored into the $MT_{n+1}$. When new record data are added, the new mapping relation will be written into the next page until fully written. Then, the special reserved block of mapping update will be erased, and renewal of data is started again from page 0 to be used as the data capable of being stored into a buffer 419 when the host computer is turned on next time. It is not necessary in the present invention to use the host computer 49 to scan logical addresses (e.g., the L value shown in FIG. 1B) for building anew a search table as in a conventional storage system. Therefore, the working procedure of the host computer 49 can be omitted, and the time of building and searching the mapping table can be greatly saved.

Of course, the present invention is characterized in that data of the mapping table can be stored into pages of a physical block to facilitate direct and quick storage into the memory of the mapping table when the system is turned on.

Figure 3:
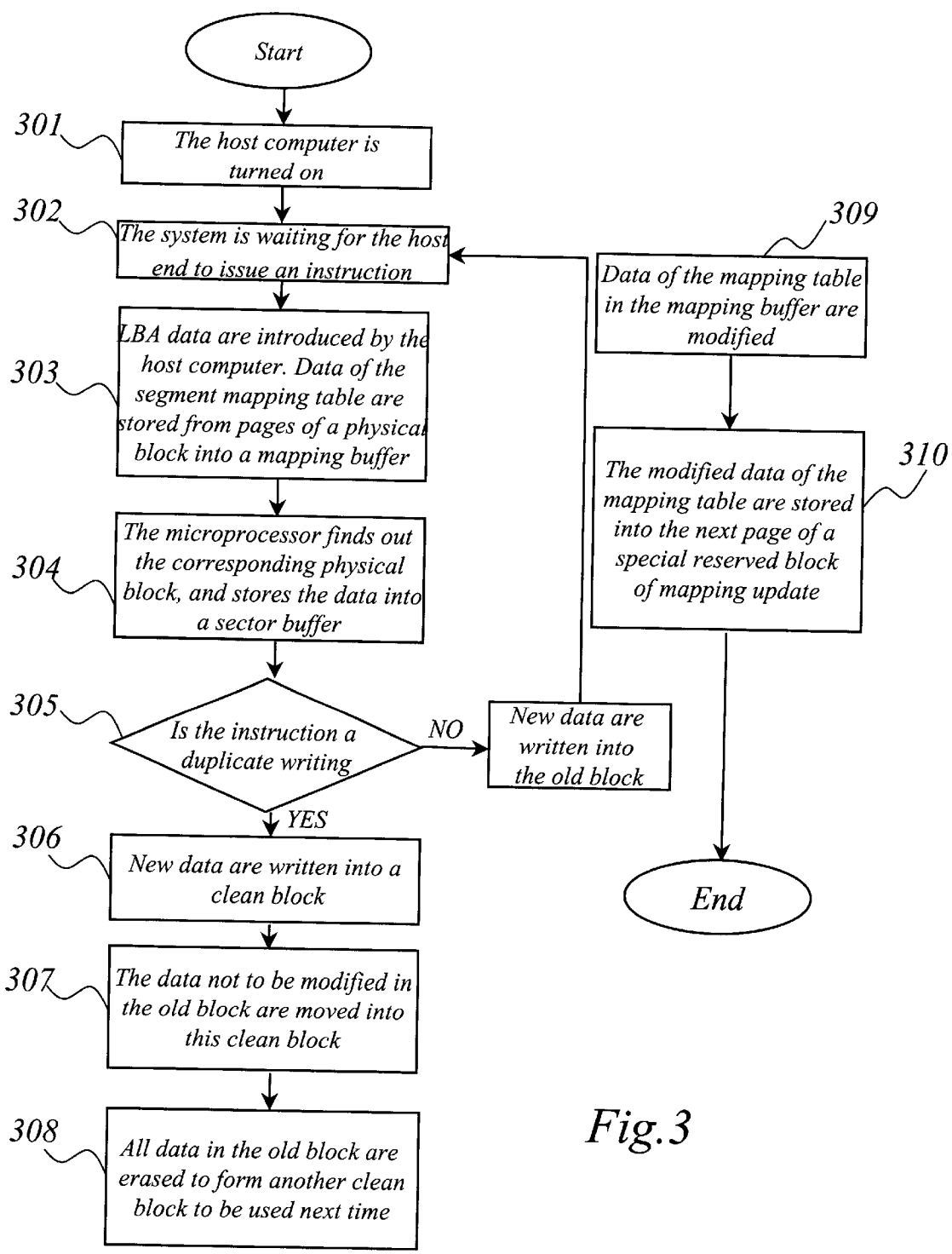
FIG. 3 is a flowchart of accessing data of a flash memory of the present invention.

Furthermore, as shown in FIG. 3, the present invention comprises the following steps.

Step 301: After the host computer or the control device is turned on or electrified, the whole system is on standby;

Step 302: The system is waiting for the host computer to issue an instruction of writing in;

Step 303: When the host computer needs to access a file, the microprocessor of the control device utilizes the already processed LBA data introduced by the host computer to know in which segment the specified physical block address exists, and stores the data of mapping table of this segment from a page of a physical block into a mapping buffer;

Step 304: The microprocessor finds out the corresponding physical block of memory of the file to be accessed by the host computer through the data of mapping table, and stores the data to be written in at the host end into a sector buffer;

Step 305: The written in page in the old block is compared with the address to be written in to determine whether the instruction of writing in is duplicate. If the answer is negative, data are directly written into the old block without the need of modifying mapping relation; otherwise, Step 306 is performed;

Step 306 (the data of some page in a physical block are to be duplicated): New data are written into a clean block reserved by the system;

Step 307: The data already stored in the old block and not to be modified are moved into this clean block;

Step 308: All data in the old block are erased to form another clean block reserved by the system to be used next time;

Step 309: Logical address data of the above block are modified and stored into the corresponding mapping table to build correct relations between them;

Step 310: Data of mapping table of the buffer are modified and stored into the next page of a special reserved block of mapping update to be used as the data capable of being conveniently searched and stored by the control device when the host computer is turned on next time.

Figure 4:
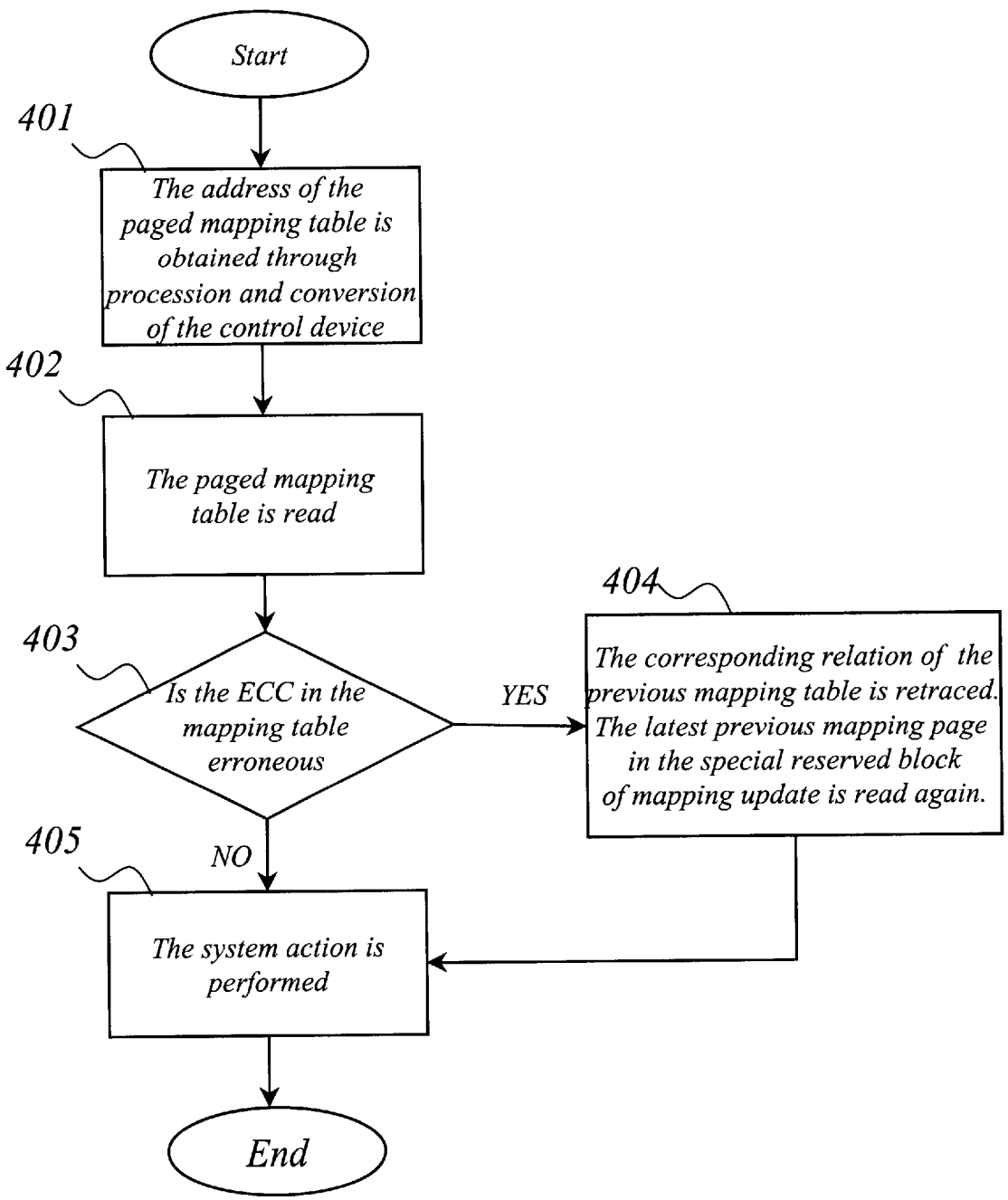
FIG. 4 is a flowchart of building a mapping table of the present invention.

Finally, as shown in FIG. 4, a flowchart of building a mapping table of the present invention comprises the following steps.

Step 401: The system obtains the address of the mapping table of the page required to be loaded in through procession and conversion of the control device. In another embodiment of the present invention, the control device directly finds out the address of the mapping table via a special mark;

Step 402: The mapping table of the specified page is read from a reserved and not mapped block;

Step 403: Whether the ECC in the mapping table is erroneous is judged. If the answer is positive (i.e., abnormal disconnection or improper operation has occurred during the previous operations), Step 404 is performed; otherwise (i.e., the previous operations are OK), Step 405 is performed;

Step 404: The corresponding relation of the previous mapping table must be retraced. The latest previous mapping page in the special reserved block of mapping update is read again into the memory;

Step 405: The system continues performing operations.

To sum up, the present invention relates to an algorithm of flash memory and, more particularly, to an algorithm of flash memory capable of quickly building a table and preventing disorder of data due to abnormal disconnection and a control system thereof.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A system for accessing memory of a storage device coupled to a host computer, the storage device being partitioned into a plurality of segments, each of the plurality of segments being partitioned into a plurality of data blocks, each of the data blocks being partitioned into a plurality of pages, the system comprising:

a physical block address corresponding to each of the plurality of data blocks;

a mapping table for each of the plurality of segments, wherein each of said physical block address is mapped to a logical block address;

a mapping table update block located in a reserved one of the plurality of data blocks in each of the plurality of segments, said mapping table update block being partitioned into a plurality of segmented pages; and mapping table update means for retrieving said mapping table from a most-recently written one of said segmented pages of said mapping table update block corresponding to a segment of a requested datum and storing said mapping table in a buffer, assigning a new physical block address to said logical block address of said requested datum in said mapping table and storing said mapping table in a new segmented page of said mapping table update block, said new segmented page being excluded from said most-recently written one of said segmented pages, said most-recently written one of said segmented pages being designated as a previously written segmented page and said new segmented page being designated said most-recently written one of said segmented pages.

2. The system as recited in claim 1 further comprising an error correction code logic circuit for determining if an error in writing said mapping table has occurred.

3. The system as recited in claim 2 further comprising mapping table retrieval means for retrieving said mapping table from said previously written segmented page if said error in writing said mapping table was determined by said error correction code logic circuit.

4. The system as recited in claim 1 further comprising marking means for marking said mapping table update block.

5. The system as recited in claim 1 wherein the storage device includes flash memory.

6. A method for accessing memory of a storage device coupled to a host computer, the storage device being partitioned into a plurality of segments, each of the plurality of segments being partitioned into a plurality of data blocks, each of the data blocks being partitioned into a plurality of pages, the method comprising the steps of:

(a) providing each of the plurality of data blocks with a physical block address;

(b) providing a mapping table for each of the plurality of segments, wherein each of said physical block address is mapped to a logical block address;

(c) reserving one of the plurality of data blocks in each of the plurality of segments as a mapping table update block;

(d) partitioning said mapping update block into a plurality of segmented pages;

(e) storing said mapping table in a first one of said segmented pages;

(f) receiving a storage device access instruction from the host computer, said storage device access instruction including said logical block address of a requested datum;

(g) determining a segment of said requested datum from said logical block address included in said storage device access instruction;

(h) retrieving said mapping table from a most-recently written one of said segmented pages of said mapping table update block corresponding to said segment of said requested datum and storing said mapping table in a buffer;

(i) determining a physical block address corresponding to said logical block address of said requested datum from said mapping table retrieved in step (h);

(j) retrieving said requested datum from said storage device;

(k) determining a new physical block address for said logical block address of said requested datum, if said requested datum was modified subsequent to step (j);

(l) assigning said new physical block address to said logical block address of said requested datum in said mapping table; and (m) storing said mapping table in a new segmented page of said mapping table update block, said new segmented page being excluded from said most-recently written one of said segmented pages, said most-recently written one of said segmented pages being designated as a previously written segmented page and said new segmented page being designated said most-recently written one of said segmented pages.

7. The method as recited in claim 6 further comprising the step of: (n) providing each of said plurality of data blocks with an error correction code.

8. The method as recited in claim 7 further comprising the step of: (o) determining from said error correction code of said mapping table update block if an error has occurred in the writing thereof.

9. The method as recited in claim 8 further comprising the step of: (p) retrieving said mapping table from a previously written one of said segmented pages of said mapping table update block corresponding to said segment of said requested datum if said error writing said mapping table update block was determined in step (o) and storing said mapping table in a buffer.

10. The method as recited in claim 6 further comprising the step of: (q) marking said mapping table update block with a special mark.

11. The method as recited in claim 6, wherein said storage device includes flash memory.

* * * * *